Aug. 17, 1926.  
A. M. HARLAND  
1,596,176  
GUARD FOR SPARE WHEEL TIRE CASINGS  
Filed May 22, 1924
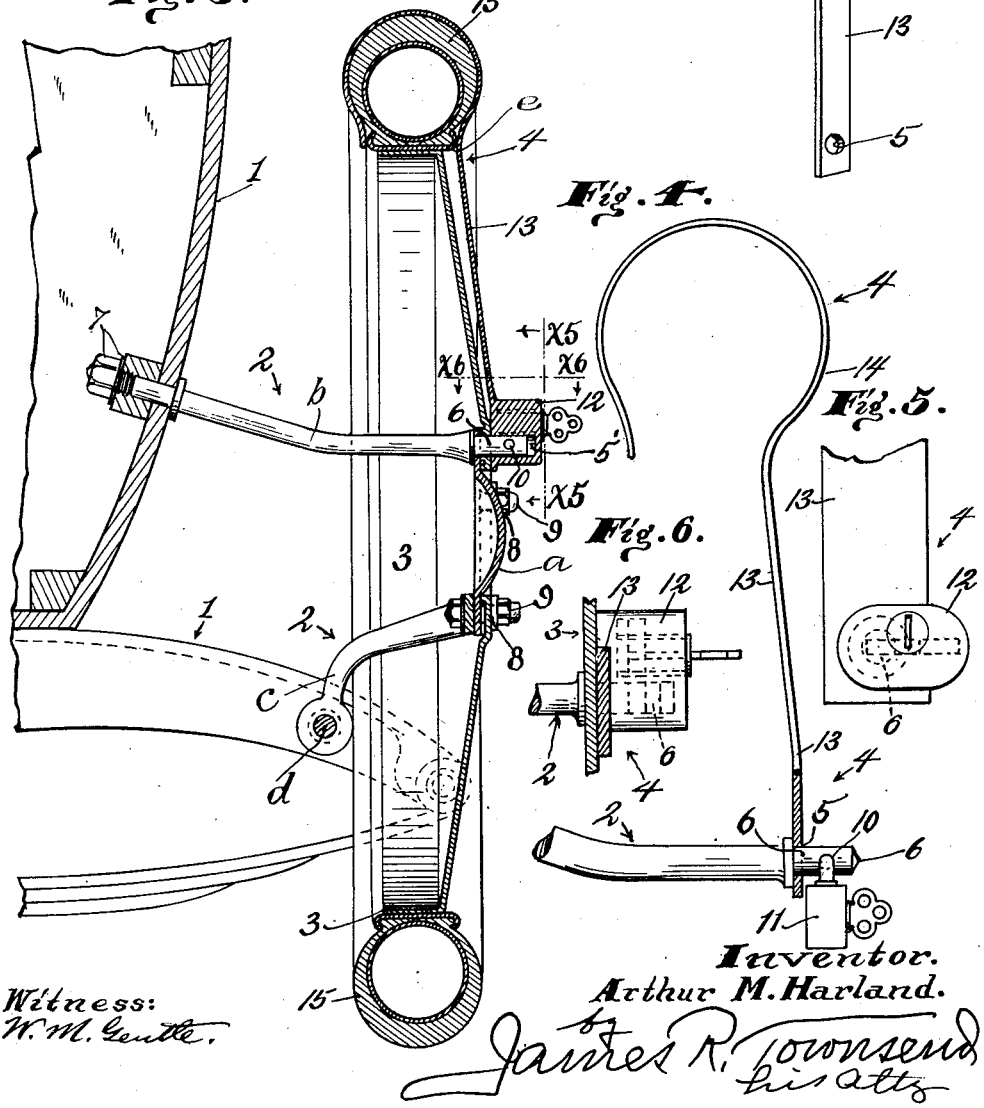
Witness:  
W. M. Gentle.
Inventor.  
Arthur M. Harland.  
by James R. Townsend  
his atty.

Patented Aug. 17, 1926.

1,596,176

UNITED STATES PATENT OFFICE.

ARTHUR M. HARLAND, OF SANTA MONICA, CALIFORNIA.

GUARD FOR SPARE-WHEEL TIRE CASINGS.

Application filed May 22, 1924. Serial No. 715,073.

This invention relates more particularly to novel and simple means for preventing theft of the tire casing and tube mounted on emergency or spare wheels of the disc or metal type. As the tire casing and tube are more expensive and as essential as the detached disc wheel and associated rim, the maximum protection against theft should be directed to the casing and tube.

A considerable number of cars now sold by dealers are furnished with disc wheels and a spare tire carrier as standard equipment. The disc wheels so furnished are usually of that type provided with bolt holes to receive the bolts or studs that fasten the wheels to the wheel flange of the running gear of the car, and it is customary to attach the wheel to the wheel flange with nuts screwed onto the bolts or studs after the wheel is in place on said studs.

There are usually five bolts or studs, more or less, projecting from the wheel flange of the running gear; and the wheel is provided with a like number of bolt holes, and the spare tire carrier is usually fastened to the rear of the vehicle to carry an emergency or spare wheel. The spare tire carrier is provided with a flange plate having studs to extend through the bolt holes in the emergency wheel. All but one of the studs extending from the flange plate of the emergency wheel bracket are usually threaded and the remaining stud is usually smooth, in many instances being an extension of a hanger which extends through and is permanently fastened to the rear wall or to the chassis of the car. The smooth lock stud extending from said flange plate is provided with means that serve for use in locking the emergency wheel to the bracket and such locking is usually effected by means of a padlock having its hasp inserted through an eye in said lock stud.

When it is desired to fasten the emergency or spare wheel to the spare wheel carrier the wheel is put in place with the studs extending through the bolt holes therein, and adapted to receive the bolts that fasten the wheel to the running gear, and the nuts are screwed onto the threaded studs and any suitable lock is then secured to a stud preferably the lock stud. The studs are so fixed to the car as to be practically non-removable.

By such an arrangement the body of the emergency wheel is securely fixed to the spare wheel carrier, but heretofore it has still been possible to deflate the tire, loosen the rim band, and remove the tire. As the tire is the essential and most valuable part of the emergency wheel, its removal practically defeats the purpose of the emergency wheel; because the spare wheel is not serviceable without a tire.

In this invention I have provided an attachment for use with such wheels in the form of a tire-securing-hook having a hole through which a stud on the flange plate will project and also having a crook shaped end that forms an extension to fit over the tire casing in such a manner as to prevent the removal of the tire casing from the wheel when the lock heretofore used for securing the wheel to the carrier is in place on the stud that passes through the hasp.

My attachment may be secured in position by the use of a pad-lock where that is most convenient; or a construction in which a spring lock is a part of the tire and wheel securing hook may be contemplated; the lock stud on the bracket being constructed to be automatically locked by the spring lock when the hook is brought into position on the wheel, tire and stud.

An object is simplicity and certainty of protection against the removal of the tire casing and tube from the wheel.

An object is to provide an attachment to secure against theft, tire casings and tubes mounted on metal spare wheels, by using the same lock that is customarily used to prevent theft of the spare wheel.

Another object is to provide a simple and efficient attachment adapted to secure the tire casing and the tube to spare wheels of the metal type and which may be easily and quickly placed in tire casing and tube securing position without the use or aid of any tools.

A further object is to provide an attachment of the character set forth that may be detached from the spare wheel and carrier when not in use and conveniently carried in the tool compartment of the car which may be under a seat in the car.

Neat appearance when in use; a device that is not cumbersome to place in position or carry; and a device that is simple, sturdy and satisfactory are other objects.

The invention comprises the novel features of construction and combinations of parts hereinafter more fully described and particularly claimed.

Other objects, advantages and features of invention may appear from the accompanying drawing, the subjoined detail description and the appended claims.

The accompanying drawing illustrates the invention in a form I at present deem preferable.

Figure 1 is a perspective view of my invention as applied to secure a tire casing to the spare wheel carried by the spare tire carrier of an automobile vehicle equipped with steel or disc wheels.

Fig. 2 is a detached perspective view of the tire securing hook shown in Fig. 1.

Fig. 3 is a vertical section through the lock stud, the wheel and the hook. The lock in this view is shown as integral with the shank of the hook and a fragment of the vehicle body and chassis is shown to illustrate a manner of attachment of the spare tire carrier to the vehicle.

Fig. 4 is a side elevation of the appliance shown in Fig. 2, and as used in combination with a lock stud having a pad lock securing means. The wheel and tire are omitted. Portions are broken away for purpose of clearness.

Fig. 5 is a fragmental section on line 5—5, Fig. 3, showing a rear view of the locking end of the hook shown in Fig. 3.

Fig. 6 is a fragmental section on line 6—6, Fig. 3, showing a plan view of the parts shown in Fig. 5.

The character 1 indicates the car or automotive vehicle to the rear end of which is secured a spare wheel carrier 2 that is provided as standard equipment on a considerable number of automobiles and comprises a flange plate $a$ that is supported some distance from the body of the car and secured thereto by means of the hanger members $b$, $c$ which are permanently fastened to the body 1 by any suitable means at as 7 and $d$, respectively. The means indicated at 7 is usually covered by the upholstering in the car and such means 7 as well as the means $d$ are usually difficult to unfasten. Wheel supporting studs 8 and a lock stud 6 are fixed to and project from the flange plate $a$ adjacent the axis of the wheel in proper spaced relation to extend through the bolt holes provided in the metal or disc wheels the emergency or spare one of which is indicated at 3. All of the studs 8 are usually threaded and are adapted to receive nuts 9 that secure the wheel in place on the spare tire carrier. The lock stud 6 is usually smooth and in the drawing is illustrated as being an extension of the hanger $b$.

The lock stud 6 is provided with a transverse hole 10 that is adapted to receive the hasp of a pad lock 11 as shown in Fig. 4.

The foregoing construction of spare wheels of the disc or metal type and the carriers therefor is well known in the art and my invention includes using in combination with such spare wheels and carriers a tire-securing-hook or guard 4 provided in Figs. 2 and 3 with a hole 5 through which a stud on the flange plate $a$ is adapted to project; and provided in Figs. 1, 3, 6 and 7 with a seat 5' adapted to receive a stud on the flange plate $a$.

The hook 4 is provided at one end with a shank 13 that extends radially of the wheel 3 to the swell of the rim $e$ where the other end of the hook is bent outwardly, thence upward, inwardly and downardly to form a crook shaped end or loop 14 that forms an extension adapted to receive and snugly fit over and encircle the tire casing 15 approximately from bead to bead in the manner shown in Fig. 3 as to prevent the removal of the tire casing from the rim $e$ even after such casing may be deflated. The free end of the crook shaped extension 14 terminates adjacent to the wheel rim when in locking position on the spare wheel.

An elongate opening $f$ is provided in the shank 13 to receive the usual bent valve stem on the inner tube in the event the tire casing lock 4 is positioned on the wheel 3 in such a way as to be likely to interfere therewith.

In Figs. 1, 3, 5 and 6 I have shown a spring lock 12 built as an integral part of the shank 13.

In practical use the only addition to the usual equipment is the hook 4 which as above stated may be made with or without a lock integral with the shank 13, and such hook is preferably made of a narrow strip of oil tempered, nickel plate steel one and one-half inches wide and commercially known as 80 point, and the hook can be easily and quickly placed in position without the use or aid of any tools by merely slipping the extension 14 over the tire casing and tube therein and then bringing the shank 13 alongside the disc of the wheel so that a stud extending from the flange plate $a$ will pass through the opening 5 in shank 13. Placing and securing any well known lock on the stud that extends through the shank 13 will not only secure the wheel to the bracket but will also maintain the hook 4 in tire locking position on the wheel. It is thus seen that the lock heretofore used for preventing theft of the spare wheel will with my device also prevent theft of the tire casing and tube from the spare wheel.

In the event the tire casing and tube locking device 4 is not desired to be used on a wheel the device 4 may be conveniently carried in the usual compartment provided in the car for carrying vehicles.

When the parts are in position and locked as shown in Figs. 1 and 3 neither the tire casing and tube nor the wheel 3 can be removed from the spare wheel carrier or hanger except by destroying the hasp or unlocking the lock.

I claim:

1. The combination with a spare wheel carrier having wheel supporting studs, of a tire guard comprising a shank rigid throughout provided at one end with an opening through which one of said supporting studs is adapted to pass and at its other end with a crook shaped extension adapted to fit over and encircle the tire casing approximately from bead to bead and terminating close to one of said beads, and locking means secured to the stud passing through said shank to secure the spare wheel and guard to the spare wheel carrier.

2. The combination with a spare wheel carrier having wheel supporting studs, of a tire guard comprising a shank rigid throughout provided at one end with an opening through which one of said supporting studs is adapted to pass and at its other end with a crook shaped extension adapted to fit over and encircle the tire casing approximately from bead to bead and terminating close to one of said beads, said shank also having an opening adapted to receive the projecting valve stem of the tire, and locking means secured to the stud passing through said shank to secure the spare wheel and guard to the spare wheel carrier.

3. A tire guard attachment for spare wheel cariers comprising a shank rigid throughout and provided at one end with an opening to receive a supporting stud of the carrier and being bent at its other end to encircle the tire casing approximately from bead to bead and terminating close to one of said beads.

4. A tire guard attachment for spare wheel carriers comprising a shank rigid throughout and provided at one end with an opening to receive a supporting stud of the carrier and being bent at its outer end to encircle the tire casing approximately from bead to bead and terminating close to one of said beads, said shank also having an opening adapted to receive the projecting valve stem of the tire.

5. A tire guard attachment for spare wheel carriers comprising a shank rigid throughout and provided at one end with an opening to receive a supporting stud of the carrier and being bent at its other end to encircle the tire casing approximately from bead to bead and terminating close to one of said beads, and a lock fixed to the end of the shank adjacent the opening therein for locking cooperation with the supporting stud of the carrier.

In testimony whereof, I have hereunto set my hand at Los Angeles, California, this 16th day of May, 1924.

ARTHUR M. HARLAND.